(12) United States Patent  
Krogmann et al.

(10) Patent No.: US 7,227,705 B2  
(45) Date of Patent: Jun. 5, 2007

(54) WIDE-ANGLE OPTICAL SYSTEM

(75) Inventors: Dirk Krogmann, Uhldingen (DE); Hans Dieter Tholl, Uhldingen (DE); Michael Gross, Salem (DE)

(73) Assignee: Diehl BGT Defence GmbH & Co., KG, Überlingen (DE)

(*) Notice: Subject to any disclaimer, the term of this patent is extended or adjusted under 35 U.S.C. 154(b) by 0 days.

(21) Appl. No.: 11/238,582

(22) Filed: Sep. 29, 2005

(65) Prior Publication Data

US 2006/0072216 A1    Apr. 6, 2006

(30) Foreign Application Priority Data

Oct. 1, 2004    (DE) .................... 10 2004 047 932

(51) Int. Cl.
*G02B 13/06* (2006.01)
*G02B 17/00* (2006.01)
*G02B 5/08* (2006.01)
*H04N 7/00* (2006.01)

(52) U.S. Cl. .................. 359/725; 359/727; 359/730; 359/850; 348/39

(58) Field of Classification Search ........ 359/725–727, 359/730–733, 850–853; 348/335, 49
See application file for complete search history.

(56) References Cited

U.S. PATENT DOCUMENTS

| 3,505,465 | A | * | 4/1970 | Rees ........................... 348/36 |
| 4,432,596 | A |   | 2/1984 | Campbell et al. |
| 5,854,713 | A |   | 12/1998 | Kuroda et al. |
| 6,424,377 | B1 |  | 7/2002 | Driscoll, Jr. et al. |
| 2001/0046080 | A1 | | 11/2001 | Kumata |
| 2004/0012710 | A1 | | 1/2004 | Yaji et al. |

FOREIGN PATENT DOCUMENTS

GB    2 368 221 A    4/2004
WO   WO 03/026272 A2    9/2002

* cited by examiner

*Primary Examiner*—Ricky Mack
*Assistant Examiner*—Jack Dinh
(74) *Attorney, Agent, or Firm*—Scully, Scott, Murphy & Presser, P.C.

(57) ABSTRACT

A wide-angle optical system (2, 40) having an objective (4, 42) and a mirror system, including a curved mirror (6, 46) for projecting a wide-angle image through the objective (4, 42) onto a detector (10, 44). At least one mirror (8, 46) of the mirror system is arranged movably relative to the objective (4, 42). It is possible to achieve a zoom function, a large elevation range and a selection of an enlarged section from the wide-angle image.

6 Claims, 3 Drawing Sheets

WIDE-ANGLE OPTICAL SYSTEM

BACKGROUND OF THE INVENTION

1. Field of the Invention

The invention proceeds from a wide-angle optical system having an objective and a mirror system, comprising a curved mirror, for projecting a wide-angle image through the objective onto a detector.

2. Discussion of the Prior Art

Panoramic cameras or omnidirectional cameras or 360° cameras are known both from the field of robotics for directing mobile robots and from the field of web cameras for Internet conferences. The cameras operate in the visible spectral region and are suitable for distances from a few metres to several metres. Such a panoramic camera is known, for example, from patent U.S. Pat. No. 6,424,377B1. The beam path of the camera is directed via a convexly curved mirror through which it is possible to attain a panoramic view.

SUMMARY OF THE INVENTION

The invention is based on the object of specifying an improved wide-angle optical system for the purpose of spatial surveillance.

This object is achieved by means of a wide-angle optical system of the type mentioned at the beginning and in the case of which according to the invention at least one mirror of the mirror system is arranged movably relative to the object. A movable mirror can be used to project a detail of the wide-angle image in an enlarged fashion. Using a mirror from the mirror system as movable mirror enables additional mirrors to be spared, and the panoramic camera can be kept compact.

The mirror system can comprise only the curved mirror, or a number of mirrors. The curved mirror is, in particular, convexly curved and can be, for example, conically, spherically, parabolically or hyperbolically curved. At least one semicircle of the surroundings adjacent to the wide-angle optical system is expediently imaged by means of the wide-angle image projected onto the objective, in particular, the image is a panoramic image or a 360° image with an elevation of at least 40°, expediently between 40° and 90°, and in particular above 100°. The wide-angle optical system is preferably capable of imaging objects arranged opposite the wide-angle optical system. In addition to the curved mirror, the wide-angle optical system advantageously comprises a further mirror, for example, a plane mirror which can be designed in a circular fashion, in particular. The optical beam path of the wide-angle optical system advantageously has only a single effective projection centre. It is possible thereby to reconstruct panoramic images (via cylindrical projection) or perspective images (via plain projection) free from defects via suitable mathematical transformations from omnidirectional images.

In a preferred refinement, in addition to the curved mirror the mirror system comprises a flat mirror as movable mirror. The objective or parts of the objective can be arranged together with a sensor inside the curved mirror such that it is possible for the wide-angle optical system to be of small design.

In a further refinement, the wide-angle optical system comprises an optical axis running through the objective and the movable mirror. It is possible thereby for the entire wide-angle image, advantageously the panoramic image, to be influenced symmetrically in a simple way by a movement of the movable mirror.

If the movable mirror can be tilted relative to the optical axis, a part of the wide-angle image or panoramic image can be singled out selectively and, for example, enlarged.

It is expedient that a single or two-fold reflection can be selected for projecting an object onto the objective. In order to project the wide-angle image or panoramic image onto the objective, the beam path from the surroundings of the wide-angle optical system can be reflected by two mirrors of the mirror system, as a result of which it is possible to keep the wide-angle optical system of small design. By reducing the beam path from two-fold reflection to a single reflection in the case of which the beam path is reflected only at one mirror of the optical system, a desired area of the wide-angle image can be projected onto the detector in an enlarged and/or rectified fashion.

It is preferred to be able to use the movable mirror to select a beam path which projects an object onto the detector from its surroundings in a way bypassing the curved mirror. A particularly distortion-free projection of an area of the wide-angle image onto the objective can be achieved. The camera objective can be moved parallel to the optical axis for the purpose of focusing (correction of the image).

In order to select a desired angular area from the wide-angle image, the movable mirror can advantageously be rotated about the optical axis.

The wide-angle image can preferably be zoomed with the aid of the movable mirror, in particular while retaining the azimuth angle of the wide-angle image. Details of the image can be singled out selectively and enlarged. Given a retention of the azimuth angle, the panoramic view of 360° can be retained despite zooming, the elevation range of the wide-angle image being zoomed, and thus the elevation angle being reduced.

A zoom function can be achieved in a particularly simple way when the movable mirror can be moved by means of a translation relative to the objective.

In an advantageous development of the invention, the curved mirror is movable. It is possible to attain a zoom function with only a single mirror of the mirror system. In this case, the camera objective can be moved parallel to the optical axis for the purpose of focusing (correction of the image).

A particularly simple zooming with only a slight, or even without an undesired, displacement of the elevation range of the wide-angle image can be attained by a means for forming the movable mirror. The movement of the mirror relative to the objective can thereby be achieved by the forming of the mirror, or be carried out in addition to a translatory movement, for example.

In addition, the invention is directed at a camera system having a wide-angle optical system as described above, a detector and an evaluation unit for processing the wide-angle image projected onto the detector.

BRIEF DESCRIPTION OF THE DRAWINGS

Further advantages emerge from the following description of the drawing. Exemplary embodiments of the invention are illustrated in the drawing. The drawing, the description and the claims include numerous features in combination. The person skilled in the art will expediently also consider the features individually and combine them to form rational further combinations.

In the drawing.

DETAILED DESCRIPTION OF THE INVENTION

Figure 1:
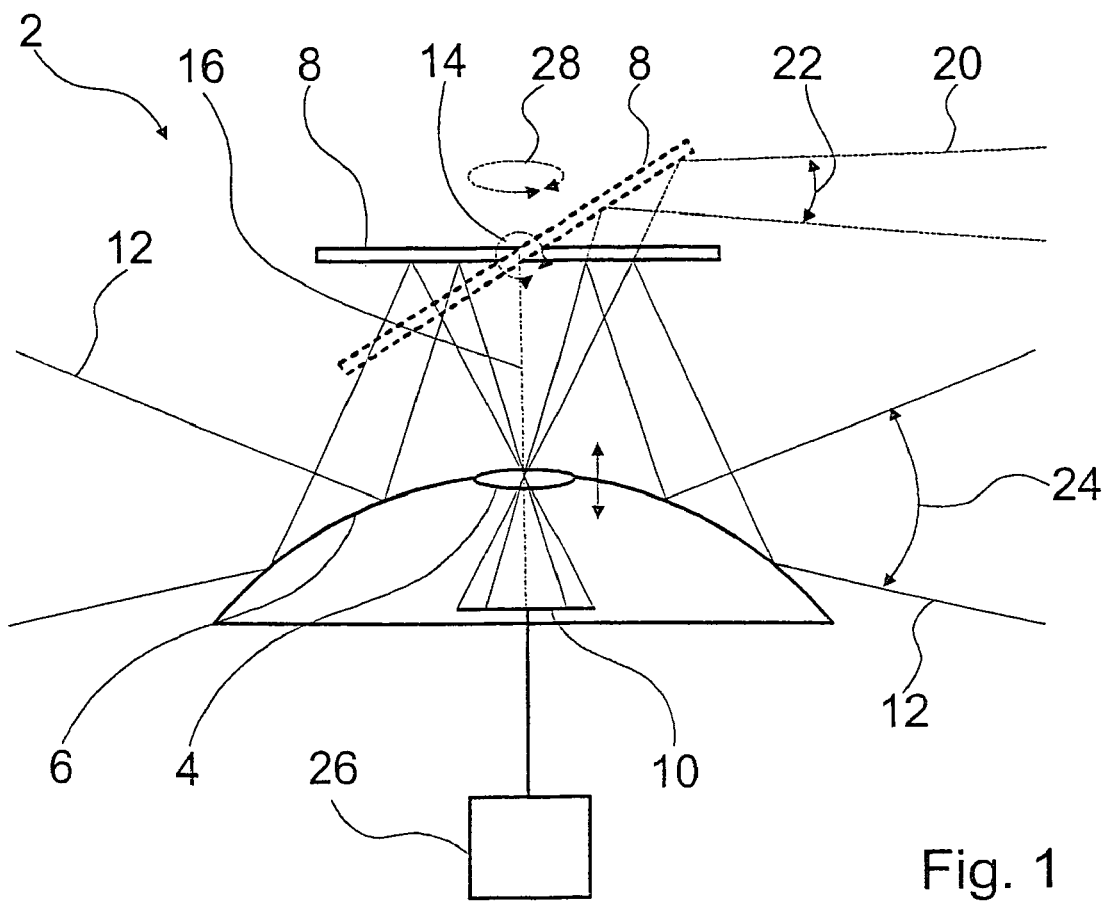
FIG. 1 shows a wide-angle camera having a spherical mirror and a tiltable and displaceable plane mirror.

FIG. 1 shows a wide-angle camera in a schematic way together with a wide-angle optical system 2. The wide-angle optical system 2 comprises an objective 4 which is illustrated only as one lens for the sake of clarity. The wide-angle optical system 2 also comprises a convexly curved spherical mirror 6 which is transparent within the aperture of the objective 4 such that light can fall onto a detector 10 from a plane mirror 8 through the objective 4. The spherical mirror 6 is of reflecting design outside the aperture of the objective 4. In a beam path 12 represented with a continuous line as in FIG. 1, a panoramic image from the surroundings of the wide-angle optical system 2 is projected by two mirrors 6, 8 onto the detector 10.

As illustrated by a double arrow 14—the plane mirror 8 can be tilted relative to an optical axis 16 with the aid of a motor 18, which for the sake of clarity is not illustrated in FIG. 1. Such a motor 18 is illustrated by way of example in FIG. 3. In order to view a section of the wide-angle image, the plane mirror 8 can be tilted continuously until, for example, it reaches the position illustrated by dashes in FIG. 1. As illustrated by a dashed beam path 20—the result is that this section is projected onto the detector 10. An elevation angle 22 of the beam path 20 is substantially smaller than an elevation angle 24 of the beam path 12, for which reason the section is projected onto the detector 10 in a substantially larger fashion by the beam path 20 than by the beam path 12.

The detector 10 is sensitive in the infrared radiation region between 8 μm and 12 μm, and comprises a microbolometer. Connected to the detector 10 is an evaluation unit 26 which comprises a signal-conditioning electronic system for rectifying and correcting the image projected onto the detector 10, an image- and signal-processing electronic system and also an electronic system for commanding and controlling the movement of the plane mirror 8 and interfaces for integration into a sensor network.

Figure 2:
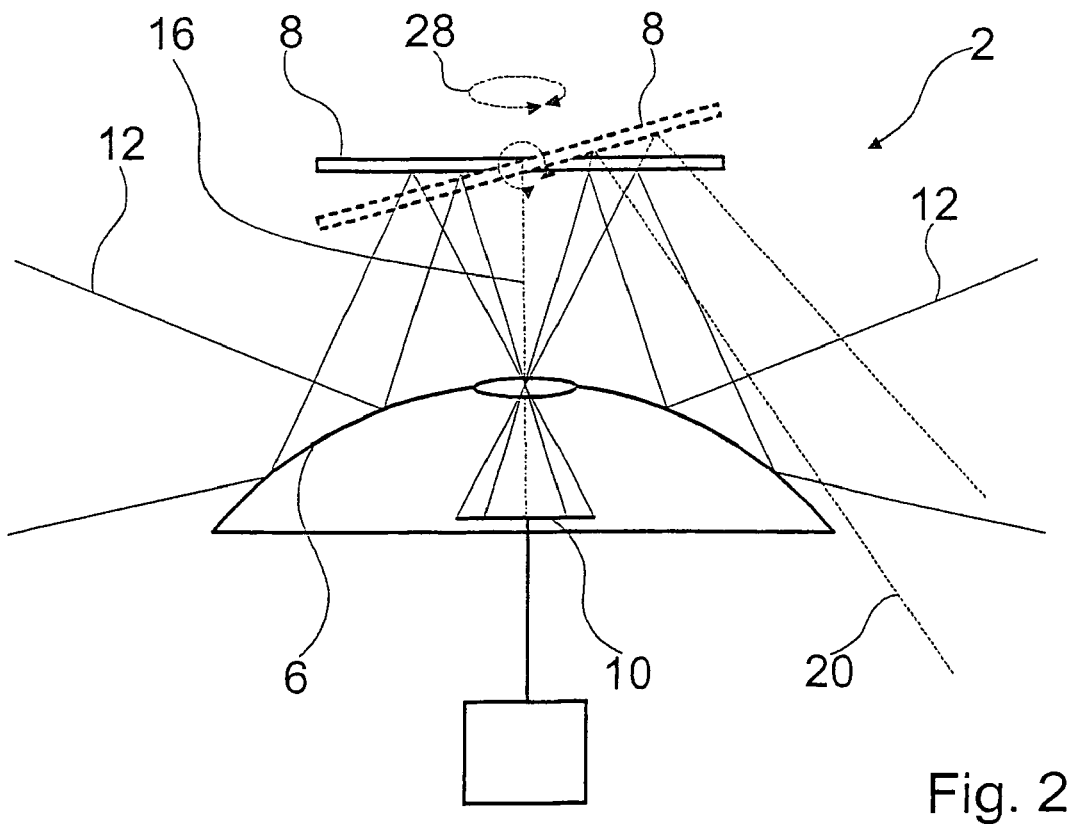
FIG. 2 shows the wide-angle camera from FIG. 1 with the plane mirror in another position.

FIG. 2 shows the wide-angle optical system 2 with the plane mirror 8 in a somewhat different tilted position. Here, the beam path 20 is directed very closely past the spherical mirror 6, as a result of which the wide-angle optical system 2 can be used to look a short distance behind the spherical mirror 6. It is possible thereby to attain a very large overall elevation angle of over 110° for the wide-angle optical system 2. The scenery of the surroundings arranged a short distance behind the spherical mirror 6 can be projected onto the detector 10 by the beam path 12 only in a very compressed fashion. In the case of a slightly tilted position of the plane mirror 8 as depicted by dashes in FIG. 2, this area can be projected onto the detector 10 in a way that is rectified and decompressed. In order to facilitate a panoramic view, the plane mirror 8 can be swivelled about the optical axis 16 by 360° in the direction of the double arrow 28. The objective 4 can be moved parallel to the optical axis 16 for the purpose of focusing (correction of the image).

Figure 3:
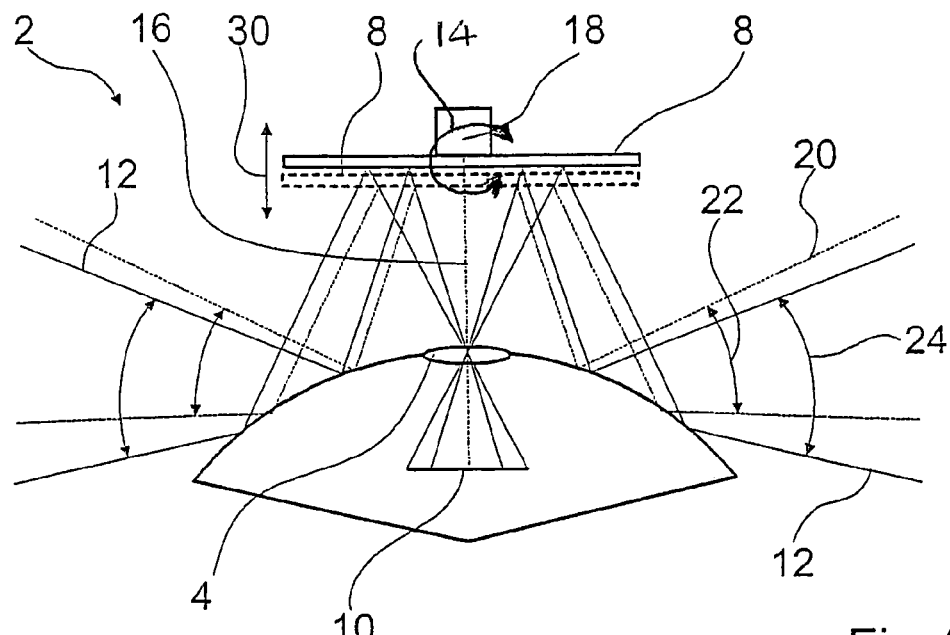
FIG. 3 shows the wide-angle camera from FIGS. 1 and 2 with a plane mirror moved in a translatory fashion.

The translatory mobility of the plane mirror 8 of the wide-angle optical system 2 is illustrated in FIG. 3. As shown in FIGS. 1 and 2—not only can the plane mirror 8 be tilted and rotated about the optical axis 16 by the motor 18, but—as indicated by a double arrow 30—it is mounted so that it can be displaced parallel to the optical axis 16. A zoom function is thereby attained. In the event of a displacement of the plane mirror 8 parallel to the optical axis 16 in the direction of the objective 4, the beam path 12 represented by continuous lines is displaced into the dashed beam path 20. The elevation angle 22 of the beam path 20 is thereby smaller than the elevation angle 24 of the beam path 12, as a result of which the zooming of the wide-angle imaging is attained. However, the elevation angle 22 is not only reduced, but also displaced a short distance upward, the result being that the zoom function is linked to a displacement of the elevation range.

Figure 4:
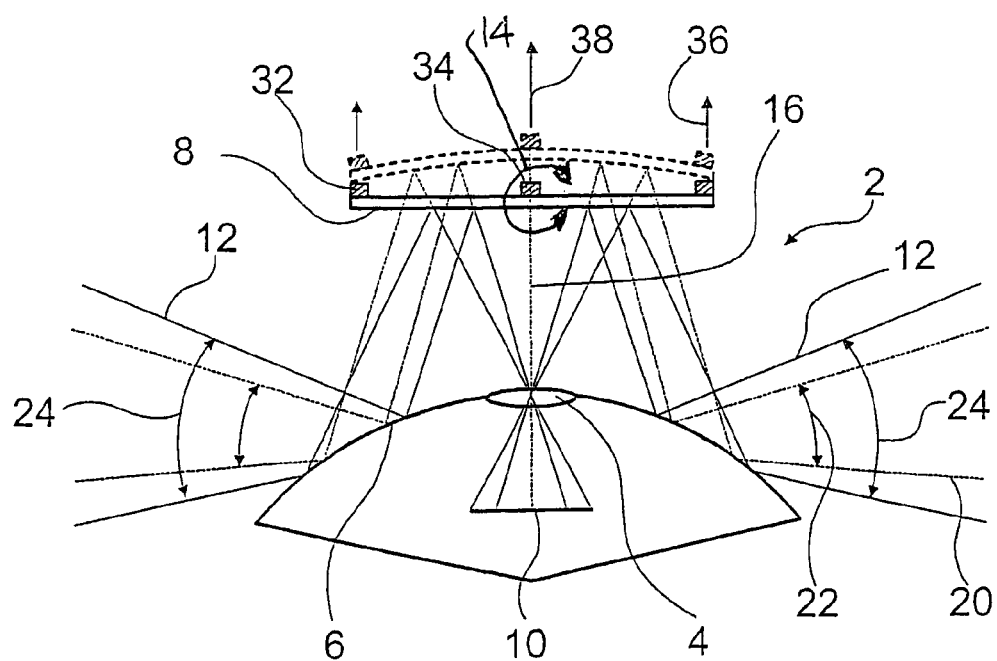
FIG. 4 shows a wide-angle camera having a spherical mirror and a plane mirror which can be bent.

In order to keep such a displacement of the elevation range small, or to eliminate it, the plane mirror 8 can be of bendable design, as illustrated in FIG. 4 in an alternative wide-angle camera. Components substantially unchanged are basically numbered with the same reference numerals. Furthermore, reference may be made as regards unchanged features and functions to the description relating to the exemplary embodiment in FIGS. 1 to 3. The following description is restricted in essence to the differences from the exemplary embodiment in FIGS. 1 to 3. The plane mirror 8 is of circular design and permanently connected on its outer edge to a support ring 32. The plane mirror 8 can be displaced parallel to the optical axis 16 with the aid of this support ring 32. Permanently connected to the circular mirror 8 at its centre is a pulling element 34 with the aid of which the centre region of the mirror 8 can be pulled upwards relative to the support ring 32, and the mirror 8 can thereby be bent, as is illustrated by dashes in FIG. 4. The mirror 8 assumes a parabolic curvature as a result. If—as indicated by arrows 36—the mirror 8 is displaced upwards together with its support ring 32 and—as indicated by an arrow 38—is pulled even further upwards by the pulling element 34, the beam path 12 is displaced from the position shown by continuous lines to the position illustrated by dashes. The elevation angle 24 is thereby reduced to the elevation angle 22, the elevation range not being displaced in height overall.

Figure 5:
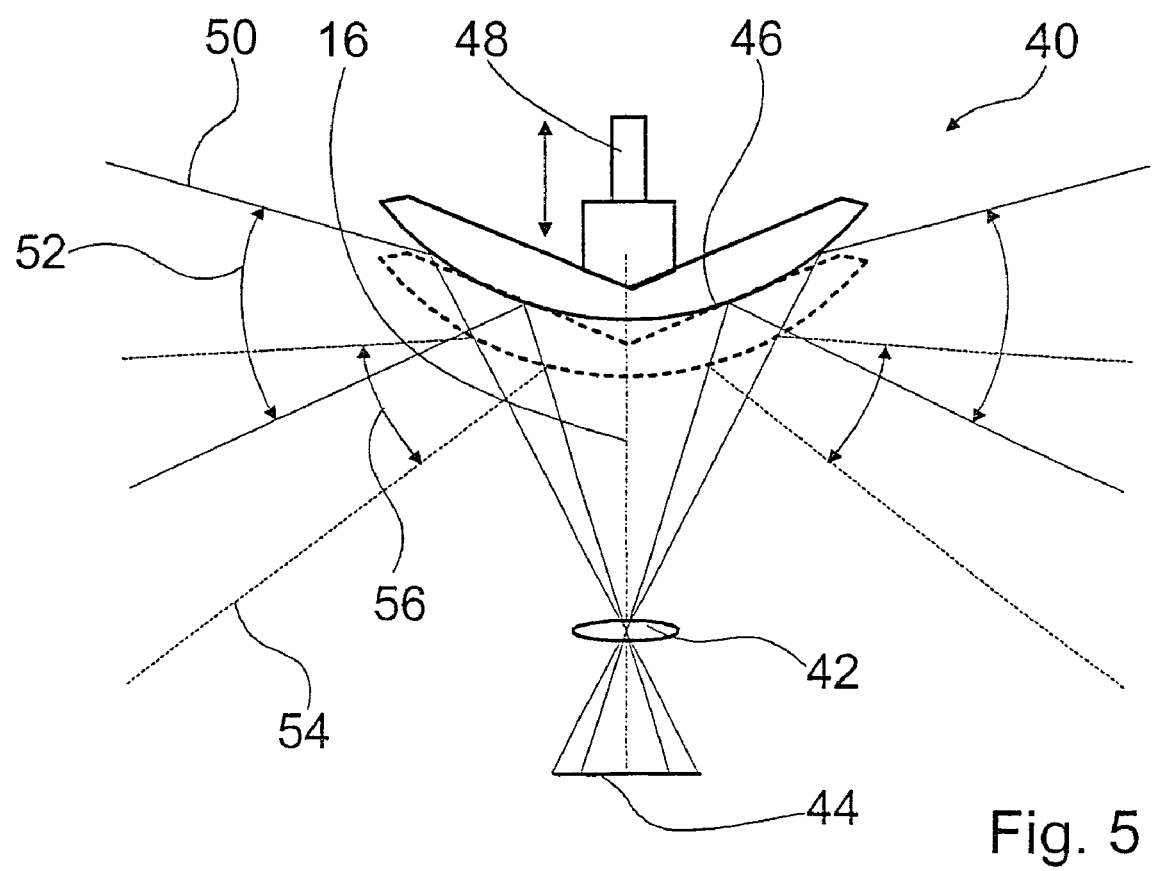
FIG. 5 shows a wide-angle camera having a movable spherical mirror.

Another wide-angle camera is shown in FIG. 5. The wide-angle camera comprises a wide-angle objective 40 which comprises a single spherical mirror 46 for the purpose of projecting a wide-angle image through an objective 42 onto a detector 44. In order to produce a zoom function, the spherical mirror 46 can be displaced with the aid of a motor 48 along the optical axis 16 of the wide-angle objective 40, such as, for example, from the position shown by continuous lines into the position illustrated by dashes. A beam path 50 with an elevation angle 52 is thereby displaced into a beam path 54 with an elevation angle 56. The elevation angle 56 is smaller than the elevation angle 52, and zooming of the wide-angle image is thereby attained. The elevation range of the beam path 50 is displaced thereby in a way similar to the case of the wide-angle optical system from FIG. 3.

The curved mirror 6, 46 is illustrated as a spherical mirror in FIGS. 1 to 5. Combinations of a plane mirror 8 with cylindrically, parabolically or hyperbolically curved mirrors can also be advantageous for the optical correction of aberrations.

| List of reference numerals | |
| --- | --- |
| 2 | Wide-angle optical system |
| 4 | Objective |
| 6 | Mirror |
| 8 | Mirror |
| 10 | Detector |
| 12 | Beam path |
| 14 | Double arrow |
| 16 | Axis |
| 18 | Motor |
| 20 | Beam path |
| 22 | Elevation angle |
| 24 | Elevation angle |
| 26 | Evaluation unit |
| 28 | Double arrow |
| 30 | Double arrow |
| 32 | Support ring |
| 34 | Pulling element |
| 36 | Arrow |
| 38 | Arrow |
| 40 | Wide-angle optical system |
| 42 | Objective |
| 44 | Detector |
| 46 | Mirror |
| 48 | Motor |
| 50 | Beam path |
| 52 | Elevation angle |
| 54 | Beam path |
| 56 | Elevation angle |

The invention claimed is:

1. A wide-angle optical system (2) having an objective (4) and a mirror system, comprising at least one curved mirror (6) and a further mirror (8) for projecting a wide-angle image through the objective (4) onto a detector (10), wherein said at least one curved mirror (6) and the further mirror (8) of the mirror system are arranged to be selectably movable along an optical axis (16) which extends through the objective (4), the further mirror (8) being a flat mirror and being the movable mirror, the optical axis (16) extending through the objective (4) and the further mirror (8) is tiltable relative to and rotatable about the optical axis (16), and the further mirror (8) is movable in translation relative to the objective (4).

2. A wide-angle optical system (2) according to claim 1, wherein a single or two-fold reflection is obtainable for projecting an object through the objective (4) by selection of a specified tilt angle of the further mirror (8) relative to the optical axis (16).

3. A wide-angle optical system (2) according to claim 1, wherein the further mirror (8) is oriented to select a beam path (20) which projects an object onto the detector (10) from surroundings thereof while concurrently bypassing the curved mirror (6).

4. A wide-angle optical system (2) according to claim 1, wherein the wide-angle image is zoomed with the aid of the further mirror (8) while retaining the azimuth angle of the wide-angle image by the tilting or moving in translation of the further mirror (8).

5. A wide-angle optical system (2) according to claim 1, including means for deforming the further mirror (8) in comparison with the original form thereof.

6. A camera system having a wide-angle optical system (2, 40) according to claim 1, including a detector (10,44) and an evaluation unit (26) for processing the wide-angle image, which is projected onto the detector (10,44).

\* \* \* \* \*